(12) United States Patent
Howald et al.

(10) Patent No.: US 9,365,730 B2
(45) Date of Patent: Jun. 14, 2016

(54) RADIATION-CURABLE ACRYLATE-BASED INK-JET PRINTING INK

(71) Applicant: HAPA AG, Volketswil (CH)

(72) Inventors: Nicole Howald, Jona (CH); Migjen Rrahimi, Wetzikon (CH)

(73) Assignee: HAPA AG, Volketswil (CH)

( * ) Notice: Subject to any disclaimer, the term of this patent is extended or adjusted under 35 U.S.C. 154(b) by 0 days.

(21) Appl. No.: 14/412,623

(22) PCT Filed: Jul. 4, 2013

(86) PCT No.: PCT/EP2013/064146
§ 371 (c)(1),
(2) Date: Jan. 2, 2015

(87) PCT Pub. No.: WO2014/006141
PCT Pub. Date: Jan. 9, 2014

(65) Prior Publication Data
US 2015/0184005 A1    Jul. 2, 2015

(30) Foreign Application Priority Data

Jul. 5, 2012 (DE) .................. 20 2012 006 432

(51) Int. Cl.
*C08F 2/46* (2006.01)
*C08F 2/50* (2006.01)
*C08G 61/04* (2006.01)
*C09D 11/101* (2014.01)
*C09D 11/322* (2014.01)

(52) U.S. Cl.
CPC ............ *C09D 11/101* (2013.01); *C09D 11/322* (2013.01)

(58) Field of Classification Search
CPC .......................... C09D 11/322; C09D 11/101

USPC .......... 522/36, 33, 6, 71, 189, 184, 1, 39, 63, 522/64; 520/1
See application file for complete search history.

(56) References Cited

U.S. PATENT DOCUMENTS

| 2010/0215921 | A1 | 8/2010 | Kagose | |
|---|---|---|---|---|
| 2012/0003435 | A1* | 1/2012 | Kameyama | C09D 11/101 428/195.1 |
| 2014/0212634 | A1* | 7/2014 | Kameyama | C09D 11/30 428/195.1 |

FOREIGN PATENT DOCUMENTS

| DE | 10 2010 078855 A1 | 11/2011 |
|---|---|---|
| EP | 1 331 251 A1 | 7/2003 |
| EP | 1 918 337 A1 | 5/2008 |
| WO | 2013-031871 | * 3/2013 |

OTHER PUBLICATIONS

Showa Denko, Advantages for UV Additive, 2012, http://www.sds.com.sg/advantages-for-uv-additive/.*
International Preliminary Report on Patentability for PCT/EP2013/064146 Filed on Jul. 4, 2013.
Search Report and Opinion of PCT/EP2013/064146 filed on Jul. 4, 2013.

* cited by examiner

*Primary Examiner* — Ling Choi
*Assistant Examiner* — Jessica E Whiteley
(74) *Attorney, Agent, or Firm* — Notaro, Michalos & Zaccaria P.C.

(57) ABSTRACT

The disclosed radiation-curable acrylate-based ink-jet ink comprises a pigment, a bifunctional acrylate and, optionally, a trifunctional or multifunctional acrylate, a compound that has an ethylenic double bond and a molecular weight of 90 to 205, and a photoinitiator in the form of an acyl phosphine oxide, and furthermore contains 0.05 to 3.0 wt. % of stabilizer and 0.05 to 1.5 wt. % of surfactant.

24 Claims, No Drawings

RADIATION-CURABLE ACRYLATE-BASED INK-JET PRINTING INK

The invention in question relates to a radiation curable inkjet printer ink substance based on acrylates, which comprises a pigment, a difunctional acrylate and, optionally, a trifunctional or multifunctional acrylate, as well as a compound (A) with an ethylenic double bond and a molecular weight from 90 to 205 in addition to a photoinitiator (B) in form of an acylphosphine oxide.

Various different inkjet printer ink substances are known in accordance with the current state-of-the-art, for example those based on solvents or water as well as inkjet printer inks that are cured by radiation. Inkjet printer inks on a solvent base dry due to the evaporation of a solvent and therefore typically contain a binding agent, colorant as well as a liquid substance with a low boiling point, which serves as the main component of the liquid phase. The solvent might be water, an organic solvent or a mixture of different solvents with low boiling points, such as described in EP 0 314 403 A1 and/or EP 0 424 714 A1. Solvent-based inkjet printer inks are subject to several drawbacks. For one, many solvents are not considered environmentally friendly. Also, such inkjet printer inks have to dry before curing in order to achieve a good printing result. It is additionally very difficult in many cases to print on certain plastics, metals or similar materials due to the poor wetting properties of many solvents.

Radiation curable inkjet printer inks are known in accordance with EP 0 882 104 B1. Such inkjet printer inks contain a polyfunctional alkoxylated and/or polyfunctional polyalkoxylated acrylate monomer amounting to 80 to 95 weight percent of the total composition as well as at least one radical photoinitiator. EP 1 593 521 also refers to a radiation-curable inkjet printer ink. This ink contains a radiation-curable oligomer in the form of unsaturated acrylate resins of low viscosity, a radiation-curable acrylate monomer selected from polyfunctional alkoxylated or polyalkoxylated acrylate monomers that compose one or multiple diacrylates or triacrylates, at least one radical photoinitiator as well as at least one surface active agent (surfactant). This inkjet printer ink has a viscosity ranging from 0.015 Pa·s to 0.008 Pa·s at 40 to 70° C. as well as a surface tension of $2.0\times10^{-4}$ to $3.0\times10^{-4}$ N/cm at 40 to 70° C. The ratio of oligomer to monomer is equal to 1:4. The known solvent-free inkjet printer inks in accordance with the current state-of-the-art require a relatively high drying energy to be provided by the respectively used UV lamp/emitter and/or exhibit only little smudge resistance in contact with different solvents.

The inkjet printer ink described in EP 1 331 251 A1 is of particular interest with regard to the technical aspects in question, particularly in terms of achievable effects. This document shows a radiation-curable inkjet printer ink composed of a pigment, a compound containing two or more ethylenic double bonds, a compound containing a single ethylenic double bond as well as exhibits a molecular weight ranging from 90 to 210, 2-benzyl-2-dimethylamino-1-(4-morpholinophenyl-) butanone-(Irgacure 369) 1 as the first initiator as well as acylphosphinoxide as the second initiator. It is considered preferable if this ink is free of solvents and/or does not contain a non-reactive solvent. Its viscosity is preferably within a range of 5 to 50 mPa·s at 25° C. This inkjet printer ink is characterized by a low viscosity, excellent photopolymerizability, superb curing properties and good dispersion stability and is well suitable for printing. In addition, it exhibits excellent adhesion on the recording medium as well as a very good resistance against solvents and water. These special properties might be due to the usage of acylphosphine oxide as one of the photoinitiators. However, this known type of ink has one significant disadvantage, due to the fact that it only allows for a single defined photoinitiator. In many applications it is, as shown in the following by the invention detailed here, advantageous if other photoinitiators can also be used, which lead to better results in individual cases when combined with an acylphosphine oxide as compared to the Irgacure 369 substance of the current state-of-the-art. This is particularly true for the printing of folding cartons with non-absorbent surfaces, such as plastic foils (and particularly PP film), which were previously printed using flexo printing and offset printing techniques. It would therefore be greatly appreciated if a more flexible and radiation-curable, particularly UV-curable inkjet printer ink, would be available, whereas it would be particularly desirable if the substance would adhere well to a non-absorbent substrate and the cured printout be scratch-resistant. The inkjet printer ink should also offer a certain degree of temperature and storage stability. It should be noted that a number of UV-curing inks do adhere well to metal surfaces, such as aluminum, but these are not sufficient with regard to the printing of plastic foils or folding cartons with non-absorbent surface coating as mentioned previously.

It was therefore the objective of the invention detailed herein to remedy the disadvantages of UV-curable inks in accordance with IEP 1 331 251 A1 as mentioned above.

The solution of the invention in question consists of a radiation-curable inkjet printer ink on an acrylate base, comprised of a pigment, a difunctional acrylate and, optionally, a trifunctional or multifunctional acrylate, a compound (A) with an ethylenic double bond and a molecular weight of 90 to 205, particularly from 120 to 205, as well as a photoinitiator (B) in the form of an acylphosphine oxide, which is characterized by the fact that it contains 0.05 to 3.0 weight percent, particularly 0.1 to 1.8 weight percent of stabilizer and 0.05 to 1.5 weight percent, particularly 0.1 to 1.1 weight percent of surfactant.

If it is stated that the solution is "composed of a pigment, a difunctional acrylate and, optionally, a trifunctional or multifunctional acrylate", then this is intended to reflect the circumstance that it is also possible to use two or more pigments. It has therefore been established that the radiation-curable inkjet printer ink proposed by the invention, particularly if white pigments are used, can do without the first photoinitiator described in EP 1 331 251 A1 if it mandatorily contains a stabilizer as well as surfactant while meeting the quantitative framework conditions designated for this purpose. The invention is generally considered flexible, particularly considering that colored pigments are also included and other suitable photoinitiators can also be used in individual cases. This is easily possible within the scope of technical efforts.

The invention shall now be described in detail using advantageous developments of the concept: with regard to the quantitative information pertaining to the various acrylates, which are to be used mandatorily or optionally, it should be noted that the difunctional acrylate should preferably amount to 30 to 90 weight percent and more preferably between 40 and 85 weight percent. The trifunctional or multifunctional acrylate should preferably be present in an amount of up to 15 weight percent, more preferably 10 weight percent, while the similarly only optional monofunctional acrylate should amount to 20 weight percent, or more preferably up to 12 weight percent.

If the term "functionality" is referenced in this regard, this refers to a functionality that is due to the double bond within the respective acrylate. For the purposes of this invention, the commercially available Miramer products are considered particularly suitable. Annex 1 is attached in this regard, which contains a listing of monofunctional, difunctional, trifunctional and multifunctional acrylates. Of course, an industry professional might also use acrylates that are not contained in the list presented by Annex 1, but are customary or well-known in the industry.

With regard to the preferable acrylates: hexanediol acrylate (Miramer M200), propoxylated neopentylglycol (NPG (PO2DA) (Miramer 216) and/or dipropylene diacrylate (Miramer 222) should preferably be used as the difunctional acrylate. Dipentaerythritol hexaacrylate (Miramer 600), trimethylpropane triacrylate (Miramer 300) and/or the ethoxylated trimethylpropane triacrylate (Miramer 3130) should be preferred with regard to the usage of trifunctional or multifunctional acrylates as part of this invention. In some cases, a monofunctional acrylate with a molecular weight of more than 210 is to be additionally used, while lauryl acrylate (Miramer 120) and/or isodecylacrylate (Miramer 130) are considered preferable. It should be noted in this regard that the list also contains compounds that comply with the definition of compound (A), which is immediately apparent to the industry professional.

The aforementioned acrylates are used for the following purposes in accordance with the invention in question: usage of the difunctional acrylate is obligatory. The trifunctional or multifunctional exhibit beneficial effects to the extent that they cause a faster curing, particularly with regard to surface hardening, as well as result in a favorable adjustment of viscosity. The monofunctional acrylate prevents the cured printouts from becoming brittle and breaking, even if the printed substrate is bent. These products therefore soften the printout or the film in such a manner that it becomes more flexible and is thus capable of better adapting to the surface.

The obligatory components of the inkjet printer ink in accordance with the invention in question includes the previously mentioned compound (A), which is composed of an ethylenic double bond and has a molecular weight of 90 to 205 and that is particularly present in the form of the acryloylmorpholine. It is considered preferable if compound (A) is present in the inkjet printer ink in accordance with the invention in the amount of 10 to 50 weight percent and even more preferably 15 to 45 weight percent. The acryloylmorpholine, and particularly the commercially available ACMO product (but also other products, for example Miramer 140 as listed in Annex (1) improves the adhesion of the inkjet printer ink on the respective substrate. It also increases the curing rate of the inkjet printer ink.

Advantages are associated with the invention in question if the substance contains a bonding agent or adhesion promoter of up to 7 weight percent, or more preferably up to 4 weight percent. There is no restriction on a specific type of bonding agent or adhesion promoter. Pentaerythritol tetrakis(3-mercaptobutanoate) (PE1) is considered particularly usable.

It is imperative for the invention in question that the designated photoinitiator (A) is provided in the form of an acrylic phosphine oxide. This substance is essential in order for the invention to achieve the desired effects, especially with regard to solving the aforementioned task/problem. The industry professional is not subjected to any crucial restrictions in this regard. It has been found that photoinitiator (B) should preferably be provided in the form of phenylbis-2,4,6-trimethyl-benzoylphosphine oxide (Irgacure 819), 2,4,6-trimethyl-benzoyldiphenylphosphine oxide (Double Cure TPO), ethyl 4-dimethylaminobenzoate-benzoyldiphenyl-phosphine oxide (Genocure EPD) and/or ethyl(2,4,6-trimethyl-benzoyl)phenyl-phosphinate (Genocure TPO-L). Usage of this photoinitiator (B) has revealed that it does not require an additional photoinitiator in the majority of cases if a white pigment is included, particularly titanium dioxide. The preferred amount of white pigment, in particular titanium dioxide, amounts to up to 20 weight percent, more preferably 10 to 16 weight percent. In other words, this means that the inkjet printer ink in accordance with the invention in question does not require another photoinitiator in addition to photoinitiator (B). The situation is generally different if the included pigment is instead a colored one or soot, preferably in the amount of 1.5 to 5 weight percent. In such a case, the invention in question is designed to be rather flexible due to the circumstance that there is no relevant restriction to a specific photoinitiator (C), which does not contain any of the structural elements of phosphine. It is, in particular, not mandatory to use 2-benzyl-2-dimethylamino-1-(4-morpholinophenyl-) butanone-1 as the photoinitiator (Irgacure 369) in addition to acylphosphine oxide acting as the second photoinitiator (C) as described in accordance with EP 1 331 251 A1. It would be preferred if photoinitiator (B) was present in the inkjet printer ink in accordance with the invention in question in an amount of 2 to 18 weight percent, or more preferably 4 to 14 weight percent.

Annex 2 designates (commercial name, structural formula, chemical nature) a number of photoinitiators that were selected based on experience. This list includes both (B) photoinitiators as well as (C) photoinitiators. What type of photoinitiators are to be allocated to which compounds referred to in Annex 2 can be seen in this listing immediately. However, it would be preferred if photoinitiator (C) wasp resent in the form of (2-dimethylamino-2-(4-methyl-benzyl)-1 (4-morpholine-4-yl-phenyl)-butane-1-one (Irgacure 379), 2-hydroxy-1-{444-(2-hydroxy-2-methyl-propionyl)benzyl-phenyl}-2-methyl-propane-1-one (Irgacure 127) and/or 4,4'-bis(diethylamino)benzophenone (Double Cure EMF).

It has already been noted above that the invention must necessarily make use of a surfactant and/or similarly acting agent as well as comply with the quantitative conditions and restrictions to a weight percentage of 0.05 to 1.5%. It would be particularly preferable if the surfactant as present as a polyether-modified polydimethylsiloxane (BYK-377).

Generally speaking, the invention in question might also contain non-reactive solvents, which do not generally provide any benefits. Therefore, it is considered generally preferable if the inkjet printer ink would be free of any solvents, especially non-reactive solvents. In individual cases, it would be possible to include up to 10 weight percent of solvent, preferably less than 5 weight percent or yet even more preferably less than 1.5 weight percent of a selected solvent. This might, for example, be an alcohol, such as ethanol, ketones, such as acetone, or an ester, such as ethyl acetate, an ether or similar substance. The exclusion of solvents to the greatest possible extend is considered a preferred rule, due to the fact that these might pass into the environment due to evaporation during inkjet printing.

It has already been noted that the invention might include both white pigments, soot as well as colored pigments. In this regard, the pigment in question should exhibit an average particle size from 10 to 300 or more preferably between 70 and 250 nm. The preferred amount of pigments is as follows: for white pigment a weight percentage of 20%, more preferably 10 to 16% and for soot and colored pigment up to 5 weight percent, more preferably 1.5 to 4 weight percent.

Concerning the selection of the stabilizer that is mandatory to be used in accordance with the invention and that should also be used in accordance with clear quantitative conditions, the invention is not subjected to any other relevant restrictions. It would be preferable if glycerol propoxylate (1PO/OH)

triacrylate (Genorad 16) and/or glycerol propoxylate esterified with acrylic acid (CAS:52408 84-1) (Genorad 20) were to be used as the stabilizer.

The inclusion of a dispersing agent would be considered advantageous for the inkjet printer ink in accordance with the invention. This particularly refers to dispersing agents based on long polymer chains. Examples for dispersants that are particularly suitable for the invention in question would be Solsperse® 24000, Solsperse® 39000, Solsperse® 35000, Solsperse® 32000, Solsperse® 76400 as produced by Lubrizol. A suitable viscosity level can also be advantageous. In this regard, the viscosity of the inkjet printer ink in accordance with the invention should be balanced at 5 to 50 mPa·s or more preferably 5 to 30 mPa·s at 25° C.

Moreover, it is also worth mentioning that it might be advantageous in some cases, to bring the molar ratio between the monofunctional acrylate and compound (A) to more than 2, or even more preferably more than 2.2. The preferable framework conditions regarding molar ratio are between 2.2 and 100 in this case. Compliance with these conditions will result in the ink adhering well to the respective substrate. The molar ratio must therefore preferably set in such a manner that the proportion of compound (A), especially ACMO as the adhesion promoter, is greater than the proportion of monofunctional acrylate, which more or less serves a softening function. The monofunctional acrylate with a molecular weight of more than 210 also retards the curing rate, while compound (A) has an accelerating effect instead. These considerations make it apparent that the invention preferably requires that the proportion of compound (A) (as determined by molar ratio) should be made greater than that of the monofunctional acrylate.

The subject of this invention is furthermore a radiation-curable inkjet printer ink on an acrylate base, comprised of a difunctional acrylate and, optionally, a trifunctional or multifunctional acrylate, a compound (A) with an ethylenic double bond and a molecular weight of 90 to 205 as well as a photoinitiator (B) in the form of an acylphosphine oxide, which is characterized by the fact that it contains 0.05 to 3.0 weight percent, particularly 0.1 to 1.8 weight percent of stabilizer and 0.05 to 1.5 weight percent, particularly 0.1 to 1.1 weight percent of surfactant. This development of the invention can be further improved based on the characteristics defined above, which also comprise the inclusion of pigments. This type of inkjet printer ink can be advantageous regarding the provisioning of colorless protective layers on colored printouts.

The radiation-curable inkjet printer ink in accordance with the invention is not restricted to a certain type of radiation. Curing can, for example, be achieved using electron beams or UV rays. In this process, the radical-curing photoinitiator absorbs the radiation energy, which results in the initiation of the polymerization reaction. The original low-viscosity composition is then turned into a cured, solid mass. This, for example, results in printed writing or an image that is characterized by a surprisingly good durability, thermal as well as light stability and additionally offers the special advantage of being resistant to smears and smudges. Mercury-based UV lamps with adjustable radiation intensity can be used for this purpose. Other vapor lamps using iron, thallium or other doping agents can alternatively be used as well. In addition, the curing process can also be suitably performed using an LED lamp.

The invention described above as well as the preferred developments stated above allow for further additives to be included in the inkjet printer ink. This preferably includes additives in the form of UV absorbers, antioxidants, optical brighteners, wetting agents, anti-foaming agents, particularly naphtha petroleum (CAS-No. 64741-65-7/BYK-088), agents inducing electrical conductivity, biocides, softening agents, thixotropic agents, organic and/or inorganic fillers and/or antistatic agents.

The special advantages provided by the radiation-curable inkjet printer ink in accordance with the invention can be briefly summarized as follows: firstly, the invention is more flexible regarding the selection of photoinitiators as described before. That way, it is even possible to fully omit photoinitiator (C) when using a white pigment. Otherwise, the invention is not restricted to a certain type of compound when using a (C) photoinitiator as the current state-of-the-art demonstrably is, as described in the introduction. Further advantages are derived from the above considerations and descriptions as well as the examples below.

The invention shall in the following be explained in more detail using a number of examples:

EXAMPLE 1

Production Example

The stabilizer (such as Genorad 16), the difunctional acrylate (Miramer), the compound (A) with an ethylenic double bond and a molecular weight between 90 and 205 (ACMO), the anti-foaming agent (Byk 088) and the surfactant (Byk 377) are mixed in a conventional mixer for 10 minutes. The mixture is then heated to 45° C. The photoinitiators are added while stirring the mixture further. Stirring is continued until all photoinitiators are dissolved. The mixture is cooled down to 25° C. The pigment dispersion is then introduced and the mixture stated above is slowly stirred in with a dissolver. Stirring then continues for 0.5 to 1 hours. The final dispersion is afterwards filtered to <2 μm.

COMPARATIVE EXAMPLES 2 AND 3

In accordance with the methodology of example 1, the following recipes of comparative examples 2 and 3 were used to create an inkjet printer ink in accordance with the invention. The (A) compound (ACMO) to be used in accordance with the invention is omitted here.

|  | Comparative examples | |
|---|---|---|
|  | 2 | 3 |
| Genorad 20 | 0.64 | 0.64 |
| Miramer M200 | 52.9 | 50.9 |
| Byk 377 | 0.4 | 0.4 |
| Byk 088 | 0.06 | 0.06 |
| Irgacure 819 | 5 | 5 |
| Acylphosphine oxide | 6 | 6 |
| Irgacure 127 |  | 2 |
| M2W1 (30% dispersion of TiO2 into M200) | 35 | 35 |
| Total | 100 | 100 |
| Viscosity mPas 25° C. | 10.6 | 11.60 |
| Curing with 4 W LED [m/min] | 25 | 25 |
| Halogen emitter @ 25 m/min dosage | 100 | 80 |
| Viscosity after 3 weeks @ 60° C. [mPas] | 10.6 | 11.4 |

Evaluation:

This ink has poor adhesive qualities, but very good stability.

EXAMPLES 4, 5, 6

Influence of ACMO and PE1 on Adhesion and Stability

In accordance with the methodology of example 1, the following recipes of comparative examples 4, 5 and 6 were used to create an inkjet printer ink in accordance with the invention.

|  | Examples | | |
|---|---|---|---|
|  | 4 | 5 | 6 |
| Genorad 20 | 1 | 1 | 1 |
| Miramer M200 | 36.54 | 37.04 | 33.54 |
| ACMO | 21 | 21 | 21 |
| Byk 377 | 0.4 | 0.4 | 0.4 |
| Byk 088 | 0.06 | 0.06 | 0.06 |
| Irgacure 819 | 5 | 3 | 3 |
| Acylphosphine oxide | 6 | 3.5 | 3 |
| PE1 |  | 4 | 8 |
| M2W1 (30% dispersion of TiO2 into M200) | 30 | 30 | 30 |
| Total | 100 | 100 | 100 |
| Viscosity @ 25° C. [mPas] | 11.3 | 11.2 | 12.5 |
| Halogen emitter @ 25 m/min dosage [mJ/cm$^2$] | 125 | 235 | 180 |
| Adhesion to folding boxes | Average | Good | Good |
| Stability | Good | Average | Bad |
| Viscosity after 3 weeks @ 60° C. [mPas] | 11.2 | 13.6 | 22.5 |

Evaluation:

The inclusion of ACMO already results in an improvement of adhesive capabilities (example 4). The addition of PE1 further improves these adhesive capabilities. However, if the amount of used PE1 is too high (example 6), the stability of the ink deteriorates.

EXAMPLES 7, 8, 9, 10 AND 11

Influence of AMCO on Adhesive Capabilities

In accordance with the methodology of example 1, the following recipes of comparative examples 7, 8, 9, 10 and 11 were used to create an inkjet printer ink in accordance with the invention.

|  | Examples | | | | |
|---|---|---|---|---|---|
|  | 7* | 8* | 9 | 10 | 11 |
| Genorad 20 | 0.64 | 0.64 | 0.64 | 0.64 | 0.64 |
| Miramer M200 (D426) | 30.9 | 30.9 | 30.9 | 20.9 | 30.9 |
| Miramer M130 | 25 | 15 |  | 10 |  |
| ACMO |  | 10 | 25 | 25 | 25 |
| Byk 377 | 0.4 | 0.4 | 0.4 | 0.4 | 0.4 |
| Byk 088 | 0.06 | 0.06 | 0.06 | 0.06 | 0.06 |
| Irgacure 819 | 5 | 5 | 5 | 5 | 4 |
| Acylphosphine oxide | 6 | 6 | 6 | 6 | 5 |
| Irgacure 127 |  |  |  |  | 2 |
| M2W1 (30% dispersion of TiO2 into M200) | 32 | 32 | 32 | 32 | 32 |
| Total | 100 | 100 | 100 | 100 | 100 |
| Viscosity @ 25° [m Pas] | 7.70 | 9.1 | 11.7 | 10.30 | 12.1 |

|  | Examples | | | | |
|---|---|---|---|---|---|
|  | 7* | 8* | 9 | 10 | 11 |
| Halogen emitter @ 25 m/min dosage [mJ/cm$^2$] | 260 | 230 | 80 | 125 | 80 |
| Adhesion to folding boxes | Very bad | Bad | Good | Good | Good |

Note:
*Comparative examples

Evaluation:

These examples show that the above-stated formulas 9 to 11 lead to an inkjet printer ink that adhere well to the non-absorbent surfaces of a folding cardboard box. The comparative examples 7 and 8 show that usage of Miramer M130 leads to poor adhesion on a folding cardboard box and a very long curing period, thereby requiring a high dosage of radiation. Examples 9, 10 and 11 show significantly improved values in comparison. The examples 9 and 11 further show that it is possible to vary the types of photoinitiators used without the desired properties being significantly affected. All formulas/recipes are sufficiently stable.

EXAMPLES 12, 13 AND 14

Additional Examples Regarding the Influence on ACMO on Adhesion and Faster Curing with the Higher-Viscosity Miramer 222 System Using Halogen Emitters and LED Curing Processes

|  | Examples | | |
|---|---|---|---|
|  | 12* | 13 | 14 |
| Genorad 20 | 0.64 | 0.64 | 0.64 |
| Miramer M222 | 49.9 | 29.9 | 9.9 |
| ACMO |  | 20 | 40 |
| Byk 377 | 0.4 | 0.4 | 0.4 |
| Byk 088 | 0.06 | 0.06 | 0.06 |
| Irgacure 819 | 6 | 6 | 6 |
| Lucirin TPO | 5 | 5 | 5 |
| C44 (25% dispersion of TiO2 into M200) | 38 | 38 | 38 |
| Total | 100 | 100 | 100 |
| Viscosity 25° | 17.45 | 18.66 | 19.57 |
| Halogen emitter @ 25 m/min dosage [mJ/cm$^2$] | 80 | 80 | 55 |
| Curing with 4 W LED, track speed [m/min] | 35 | 55 | 65 |
| Adhesion to folding boxes | Bad | Average-good | Good |

Note:
*Comparative example

Evaluation:

Comparative example 12 shows that the omission of ACMO results in poor adhesion of the ink on the folding cardboard box, while the inclusion in accordance with examples 13 and 14 result in a significant improvement. It is also apparent from the table that the track speed when curing using a 4 W LED can be set higher when ACMO is added. This means that a lesser dose of radiation is required in order to lead to the desired success in accordance with the invention. All inks are sufficiently stable in these examples as well.

Annex 1

List of acrylate monomers used in accordance with the invention (commercial name, chemical designation, abbreviation, structural formula)

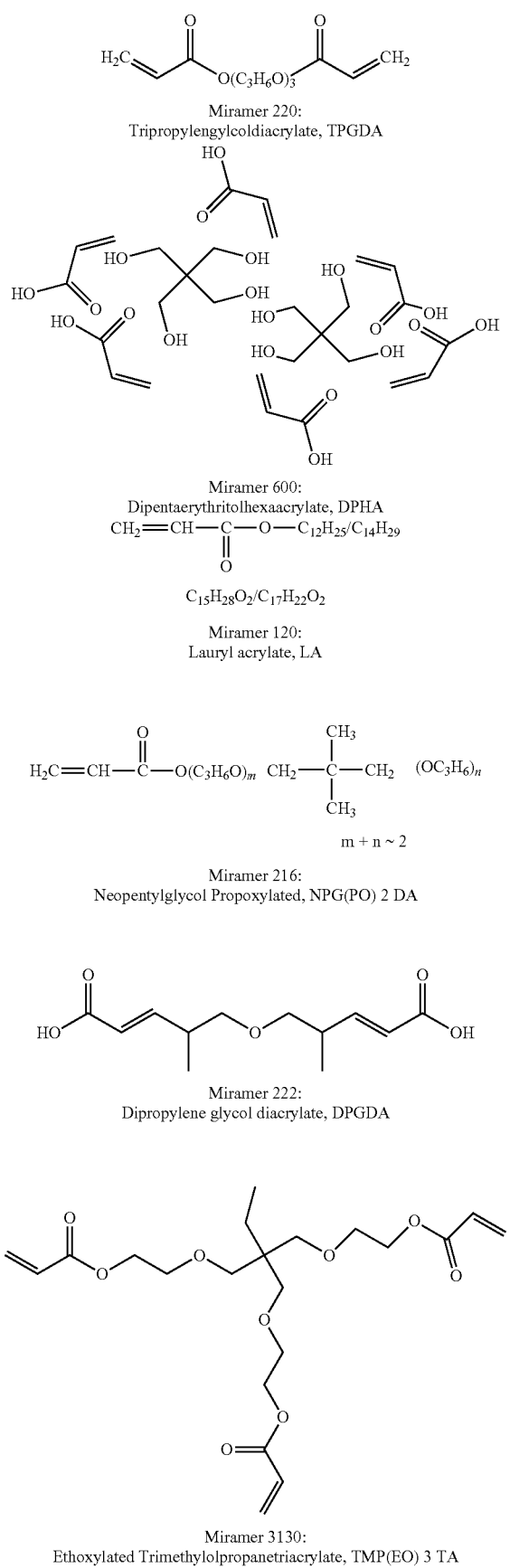
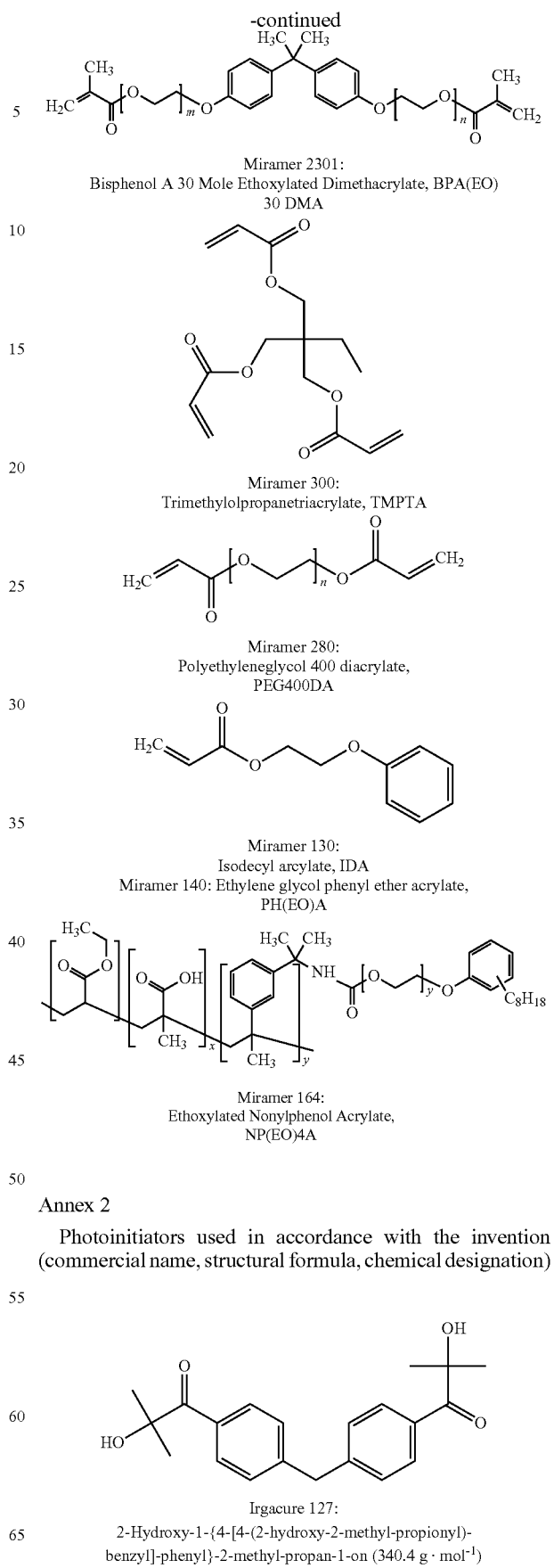
Annex 2
Photoinitiators used in accordance with the invention (commercial name, structural formula, chemical designation)
Irgacure 127:
2-Hydroxy-1-{4-[4-(2-hydroxy-2-methyl-propionyl)-benzyl]-phenyl}-2-methyl-propan-1-on (340.4 g · mol$^{-1}$)

-continued

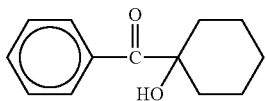

Irgacure 184:
1-Hydroxycyclohexylphenylketon
(204.3 g · mol$^{-1}$)

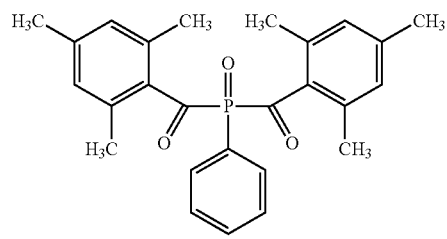

Irgacure 819:
Phosphineoxid, phenylbis 2,4,6-trimethylbenzol)
(418.5 g · mol$^{-1}$).
Main component of Irgacure 2022, 360, 2022

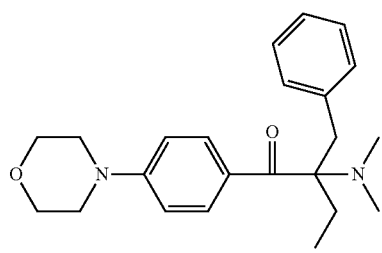

Irgacure 369:
2-Benzyl-2-dimethylamino-1-
(4-morpholinophenyl)-butanon-1
(3665 g · mol$^{-1}$)

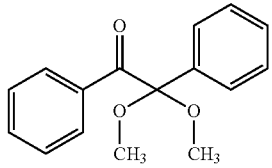

Irgacure 651:
2,2-Dimethoxy-2-Phenylacetophenon
(256 g · mol$^{-1}$)

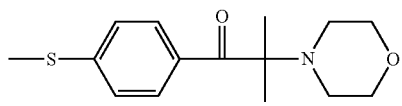

Irgacure 907:
2-Methyl-1[4-(methylthio)phenyl]-
2-morpholinopropan-1-on
(279.4 g · mol$^{-1}$)

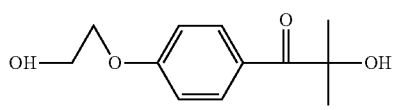

Irgacure 2959:
1-[4-(2-Hydroxyethoxy)-phenyl]-1-hydroxy-
2-methyl-1-propan-1-on (224.3 g · mol$^{-1}$)

-continued

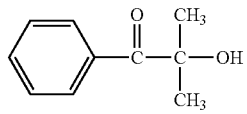

Darocur 1173:
2-Hydroxy-2-methyl-1-phenyl-propan-1-on
(164.2 g · mol$^{-1}$)

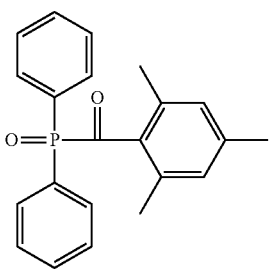

Double Cure TPO:
2,4,6-Trimethyl
benzoyl-diphenyl-phosphinoxid
(348.37 g · mol$^{-1}$)

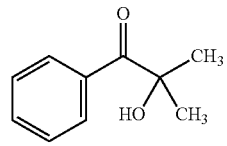

Genocure DHMA:
2-Hydroxy-2-methyl-1-
phenyl-1-propanon
(164.2 g · mol$^{-1}$)

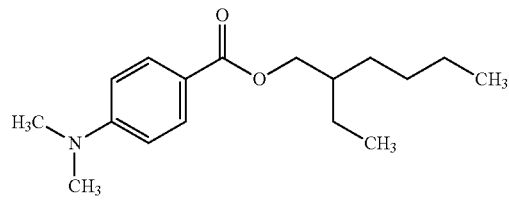

Genocure EHA:
2-ethylhexyl
4-methylamino-benzoat
(277.4 g · mol$^{-1}$)

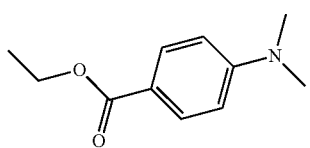

Genocure EPD:
Ethyl-4-Dimethylamino-benzoat
Benzoyldiphenylphosphinoxid
(193.2 g · mol$^{-1}$)

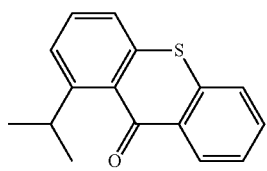

Genocure ITX:
Isopropylthioxanthon
(254.3 g · mol$^{-1}$)

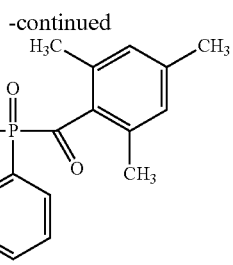

Genocure LTM:
Trimethyl
(384.4 g · mol$^{-10}$)

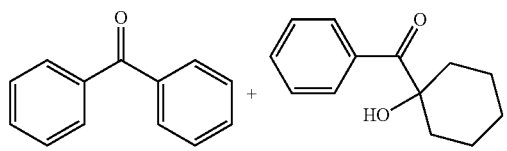

Genocure LBC:
1-Hydroxycyclohexyl
Phenylketon + Benzophenon
(182.138 g · mol$^{-1}$)

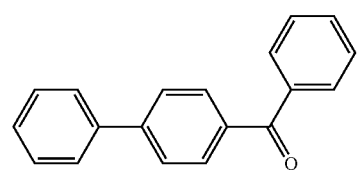

Genocure PBZ:
4-Phenylbenzophenon
(259 g · mol$^{-1}$)

Irgacure 754
Mixture of Oxy-phenyl-acetic
acid 2-[2-oxo-2-phenyl-acetoxy-ethoxy]-
ethylester and Oxy-phenyl-acetic acid 2-[2-hydroxy-ethoxy]-ethylester

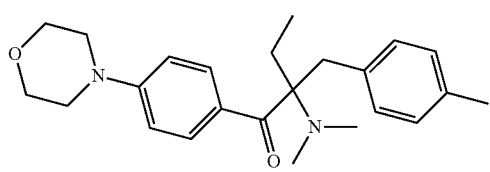

Irgacure 379:
2-Dimethylamino 2-(4-methyl-benzyl)-1-(4-morpholin-4-yl-phenyl)-
butan-1-on
(380.5 g · mol$^{-1}$)

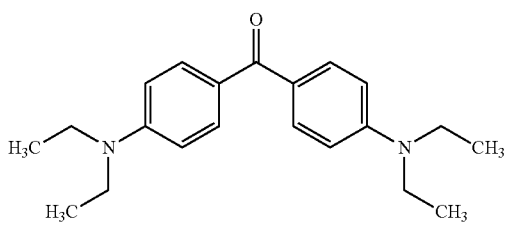

Double Cure EK:
4,4'-Bis(diethylamino)
benzophenon (324.5 g · mol$^{-1}$)

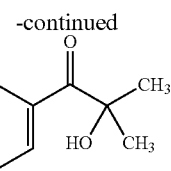

Double Cure 173:
2-Hydroxy-2-methylpropiophenon
(164.2 g · mol$^{-1}$)

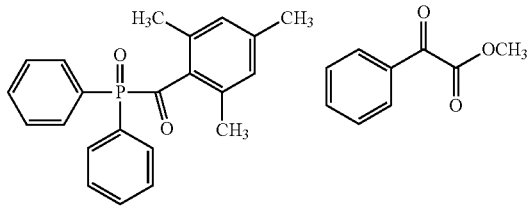

Double Cure TPO-L
75% Diphenyl (2,4,6-trimethylbenzoyl)
phosphinoxid (324.5 g · mol$^{-1}$) + 25%
Methylbenzoylformat (164.1 g · mol$^{-1}$)

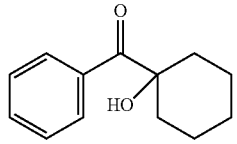

Double Cure 184:
1-Hydroxycyclohexylphenylketon
(204.26 g · mol$^{-1}$)

The invention claimed is:

1. Radiation-curable inkjet printer ink on an acrylate base, comprised of a pigment, a difunctional acrylate and, optionally, a trifunctional or multifunctional acrylate, a compound (A) in the form of acryloyl morpholine or ethylenglycolphenyletheracrylate (PH(EO)A) as well as a photoinitiator (B) in the form of an acylphosphine oxide, and a monofunctional acrylate with a molecular weight higher than 210 in an amount of up to 20 weight percent which is characterized by the fact that it contains 0.05 to 3.0 weight percent of stabilizer and 0.05 to 1.5 weight percent of surfactant and that the molar ratio between monofunctional acrylate and compound (A) amounts to 2.2 to 100.

2. Inkjet printer ink in accordance with claim 1, characterized by the fact that it contains the difunctional acrylate in an amount of 30 to 90 weight percent.

3. Inkjet printer ink in accordance with claim 1, characterized by the fact that it contains a trifunctional or multifunctional acrylate in an amount of up to 15.

4. Inkjet printer ink in accordance with claim 1, characterized by the fact that it contains photoinitiator (B) in an amount of 2 to 18 weight percent.

5. Inkjet printer ink in accordance with claim 1, characterized by the fact that it contains the compound (A) in an amount of 10 to 50 weight percent.

6. Inkjet printer ink in accordance with claim 1, characterized by the fact that it contains an adhesion promoter.

7. Inkjet printer ink in accordance with claim 6, characterized by the fact that the adhesion promoter is present in an amount of up to 7 weight percent.

8. Inkjet printer ink in accordance with claim 1, characterized by the fact that it contains a white pigment.

9. Inkjet printer ink in accordance with claim 8, characterized by the fact that it contains white pigment in an amount of up to 20 weight percent.

10. Inkjet printer ink in accordance with claim 1, characterized by the fact that glycerol propoxylate (1PO/0H)triacrylate and/or glycerol propoxylate esterified with acrylic acid (CAS:52408-84-1) are used as the stabilizer.

11. Inkjet printer ink in accordance with claim 1, characterized by the fact that the difunctional acrylate is present as hexanediol diacrylate, propoxylated neopentyl glycol (NPG (PO)2DA) and/or dipropylene acrylate.

12. Inkjet printer ink in accordance with claim 1, characterized by the fact that the trifunctional or multifunctional acrylate is present as dipentaerythritol hexaacrylate, trimethylolpropane triacrylate and/or ethoxylated trimethylolpropane triacrylate.

13. Inkjet printer ink in accordance with claim 1, characterized by the fact that the monofunctional acrylate is present as lauryl acrylate and/or isodecyl acrylate.

14. Inkjet printer ink in accordance with claim 1, characterized by the fact that the photoinitiator (B) is present in the form of phenyl-bis-2,4,6-trimethyl benzoylphosphine oxide, 2,4,6-trimethylbenzoyl-diphenylphosphine oxide, ethyl 4-dimethylaminobenzoate-benzoyldiphenyl phosphine oxide and/or ethyl (2,4,6-trimethylbenzoyl) phenylphosphinate.

15. Inkjet printer ink in accordance with claim 1, characterized by the fact that it contains a photoinitiator (C) in addition to photoinitiator (B) that does not have any structural elements of phosphine oxide.

16. Inkjet printer ink in accordance with claim 15, characterized by the fact that it contains photoinitiator (C) in the form of
(2-dimethylamino-2-(4-methyl-benzyl)-1 (4-morpholine-4-yl-phenyl)-butane-1-on, 2-hydroxy-1-{4-[4-(2-hydroxy-2-methylpropionyl) benzyl]-phenyl}-2-methyl-propane-1-on and/or 4,4'-bis (diethylamino) benzophenone.

17. Inkjet printer ink in accordance with claim 1, characterized by the fact that the surfactant is present as a polyether-modified polydimethylsiloxane.

18. Inkjet printer ink in accordance with claim 1, characterized by the fact that it contains additives in the form of UV absorbers, antioxidants, optical brighteners, wetting agents, anti-foaming agents.

19. Inkjet printer ink in accordance with claim 1, characterized by the fact that it is free of solvents.

20. Inkjet printer ink in accordance with claim 1, characterized by the fact that the pigment exhibits an average particle size of 10 to 300 nm.

21. Inkjet printer ink in accordance with claim 1, characterized by the fact that the viscosity amounts to 5 to 50 mPa·s at 25° C.

22. Inkjet printer ink in accordance with claim 1 characterized by the fact that the molar ratio between monofunctional acrylate and compound (A) is higher than 2, and wherein said compound does not include N-vinylcaprolactam (NVC).

23. Inkjet printer ink in accordance with claim 22, characterized by the fact that the molar ratio amounts to 2.2 to 100.

24. Radiation-curable inkjet printer ink on an acrylate base, comprised of a difunctional acrylate and, optionally, a trifunctional or multifunctional acrylate, a compound (A) in the form of acryloyl morpholine or ethyleneglycolphenylether-acrylate (PH(EO)A) as well as a photoinitiator (B) in the form of an acylphosphine oxide, and a monofunctional acrylate with a molecular weight higher than 210 in an amount of up to 20 weight percent which is characterized by the fact that it contains 0.05 to 3.0 weight percent of stabilizer and 0.05 to 1.5 weight percent of surfactant and that the molar ratio between monofunctional acrylate and compound (A) amounts to 2.2 to 100.

* * * * *